Dec. 21, 1954   R. H. NAGEL   2,697,731
ALCOHOL SYNTHESIS PROCESS
Filed Feb. 7, 1951
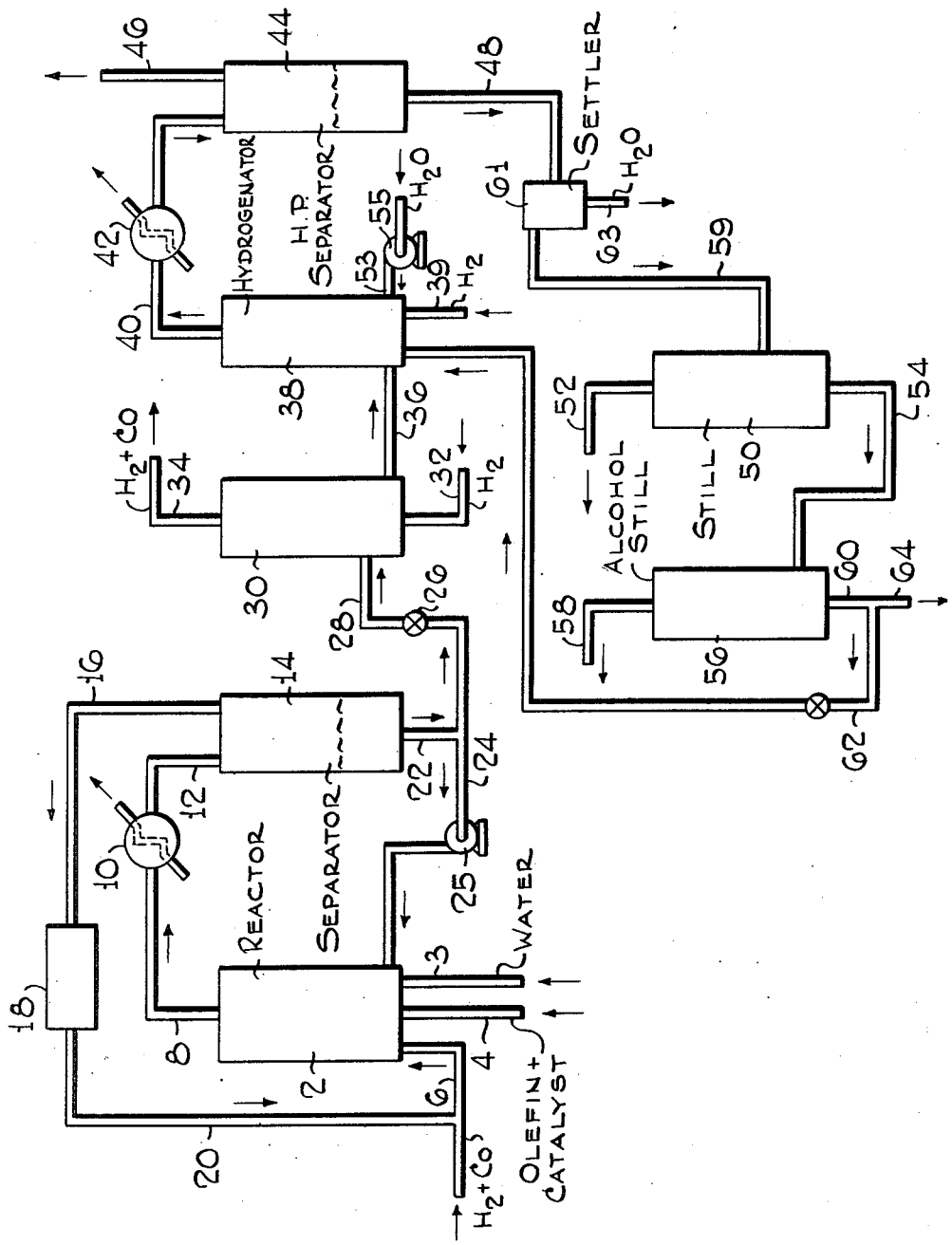
Richard H. Nagel  Inventors
By J. Cashman  Attorney

United States Patent Office 2,697,731
Patented Dec. 21, 1954

2,697,731

ALCOHOL SYNTHESIS PROCESS

Richard H. Nagel, Elizabeth, N. J., assignor to Standard Oil Development Company, a corporation of Delaware Application February 7, 1951, Serial No. 209,815

8 Claims. (Cl. 260—604)

The present invention relates to the production of oxygenated organic compounds by the catalytic reaction of olefins with hydrogen and carbon monoxide. More specifically, the present invention presents a process for increasing the yield of alcohol that may be obtained at the expense of undesirable secondary reaction products resulting from this process.

It is now well known in the art that oxygenated organic compounds may be synthesized from olefins by reaction of the latter with carbon monoxide and hydrogen in the presence of catalyst containing cobalt or iron in a two stage process. In the first stage, the olefinic material, the catalyst, and proper proportions of CO and H₂ are reacted to give a product which consists predominantly of aldehydes, and this material, after suitable treatment to remove catalyst, is hydrogenated in the second stage to give the corresponding primary alcohols. The overall reaction consists essentially of an addition of H₂ and CO to the unsaturated linkage and may be formulated as follows:

Stage 1 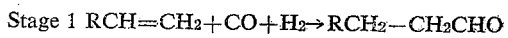

Stage 2 

It is thus seen that both the aldehyde and the alcohol formed as a result of the reaction contain one more carbon atom than the olefinic material from which they are derived.

The carbonylation reaction provides a particularly effective method for preparing valuable primary alcohols, which find large markets particularly as intermediates for solvents, detergents and plasticizers. The carbonylation, or "Oxo" process, as it is sometimes called, may be used effectively with long and short chain olefinic compounds of all kinds, depending on the type alcohol desired. Thus, straight and branch chained olefins and diolefins such as propylene, butylene, butadiene, pentene, pentadiene, hexene, heptene, olefin polymers such as di- and tri-isobutylene, hexene and heptene dimers, polypropylenes, and olefinic fractions from the hydrocarbon synthesis process, thermal or catalytic cracking operations, and other sources of hydrocarbon fractions containing such olefins may be used as starting material, depending on the nature of the final product desired. Similarly, oxygenated hydrocarbons containing olefinic linkages, as unsaturated acids, ketones, alcohols, aldehydes and the like, may be used.

The catalysts for the first stage of the process are usually employed in the form of salts of the catalytically active metals with high molecular weight fatty acids such as stearic, palmitic, oleic, naphthenic and similar acids. Thus, as suitable catalysts are such organic salts as cobalt stearate, oleate, or naphthenate or iron linoleate. These salts are soluble in the liquid olefin feed and may be supplied to the first reaction zone as hydrocarbon solutions or preferably, dissolved in the olefin feed. Other forms of cobalt or iron, as oxides, carbonates, or water soluble salts may also be employed.

The synthesis gas mixture fed to the first stage may consist of any ratio of H₂ to CO, but preferably these two gases are present at about 1.0 volume hydrogen per volume CO. The conditions for olefins reacting with H₂ and CO vary somewhat in accordance with the nature of the olefin feed, but the reaction is generally conducted at pressures in the range of about 1500 to 4500 p. s. i. g. and at temperatures in the range of about 150° to 450° F.

The quantity of H₂+CO with respect to olefins used may vary within wide ranges, for example, from 1000 to 45,000 cu. ft. of H₂+CO per barrel of olefin fed. In general, about 2,500 to 15,000 cu. ft. of H₂+CO per barrel of olefin fed are employed.

At the end of the first stage, the reaction product and unreacted materials are generally transferred to a catalyst removal or decobalting zone, wherein under the influence of heat and an inert gas, the aldehyde product is freed from the metal carbonyl catalyst. Thereupon the aldehyde product is passed to a hydrogenation vessel, where the aldehydes are hydrogenated to alcohols. As hydrogenation catalyst here, may be employed such materials as supported or unsupported metallic nickel, cobalt, sulfactive catalysts as tungsten, molybdenum and nickel sulfides, alone or in combination, supported or unsupported, or copper chromite, or other carbonyl group-reducing catalysts. In the hydrogenation step, the temperatures are generally between the range of 150°–550° F. and the pressures within the range of about 1500–4500 p. s. i. g.

The final stages of the process involve the separation of the hydrogenated material from the non-hydrogenated residue, and it is to these stages and to the hydrogenation stage, that the present invention applies. As it is performed generally in the art, the aldneydhes are hydrogenated under the conditions referred to above, then the crude hydrogenation product is first subjected to a distillation process to distill unreacted hydrocarbons boiling below the alcohol range, and the bottoms from this distillation, comprising the alcohol fraction, is subject to a second distillation stage, where the alcohols are taken overhead. The bottoms from this alcohol distillation, consisting of a complex mixture of polymeric materials as polymerized aldehydes and ketones, acetals, high molecular weight ethers, secondary alcohols, etc., and which may comprise up to 20–30% of the total hydrogenator effluent, have been in the past considered to be only of secondary value as fuel. These bottoms had the effect of cutting down substantially, the yield and alcohol selectivity of the process and increasing the difficulty of separating the desired alcohol from these bottoms.

Closely related to the problem of bottoms formation is the problem of a suitable catalyst for hydrogenation of the first stage aldehyde product. It is generally more desirable to employ as a hydrogenation catalyst in the alcohol synthesis reaction, a catalyst that is not poisoned by sulfur or sensitive to even small amounts of carbon monoxide which is generally present in commercial hydrogen, and in particular in streams present in the aldehyde synthesis process. Thus, nickel or cobalt hydrogenation catalysts, though of high activity, are not only readily poisoned by small amounts of sulfur but in the presence of carbon monoxide they react to form, under the conditions prevailing in the hydrogenation zone, the respective volatile carbonyls, which not only deplete the catalyst bed but also results in deposition of such metal on hot surfaces, resulting in plugging and poor heat transfer. A particularly desirable class of catalysts for this hydrogenation process not subject to the above disadvantages has been found to be the sulfur-resistant, or sulfactive catalysts, such as molybdenum sulfide, supported on an activated carbon support. Not only is this type of catalyst resistant to sulfur and to carbon monoxide poisoning, but also, it is of high physical ruggedness and characterized by a long life. However, it has been observed that this type of catalyst tends to promote the formation of acetals during the course of the hydrogenation. This acetal formation may possibly be catalyzed by small quantities of sulfur compounds associated with the sulfactive catalyst, and represents a distinct and significant loss of potential alcohol yield.

This disadvantage is more pronounced when the potential yield is enhanced by addition of water to the first stage. Under these conditions, the aldehyde synthesis reaction is more selective (i. e. forms less bottoms), and the increased potential yield is actually realized as alcohol if a non-acetalizing hydrogenation catalyst, such as a supported nickel catalyst is employed in the hydrogenation stage. But if a sulfide type catalyst is employed, the potential improvement is substantially decreased, probably as a result of acetal formation. These considerations are illustrated in the following data.

*Effect of water injection to Oxo stage*

| | A | B | C | D | E |
|---|---|---|---|---|---|
| Feed | | C₈ Oxo aldehydes from C₇ polypropylene cut | | | |
| Hydrogenation | Bomb Nickel | Plant MoS₂ on Act. Carbon. | Bomb Nickel | Bomb Nickel | Plant MoS₂ on Act. Carbon. |
| Feed Rate, B/SD | | 215 | | | 165. |
| Percent Water Injection (Oxo) | 3 | 3 | 2 | 0 | 0. |
| Percent Water Injection (Hydro) | 10 | 9–10 | 6 | 10 | 10. |
| Selectivity to: | | | | | |
|   C₈ Hydrocarbon | 1.0 | 1.0 | 0.5 | 0.2 | 5.5. |
|   C₈ Aldehyde | 2.2 | 6.1 [1] | 1.7 | 1.3 | 3.0. |
|   C₈ Alcohol | 93.7 | 82.9 | 92.4 | 82.6 | 76.0. |
|   C₉ Alcohol | | 0.3 | 1.2 | 0.3 | 0.1. |
|   Bottoms | 3.1 | 9.2 | 4.2 | 15.4 | 15.4. |
| Oxo Conversion, By Dist | 66 | 69 | 66 | 74.2 | 74.6. |

[1] By carbonyl No., less than 1% C₈ aldehyde present.

The above data show that when water is injected into the Oxo, as well as the hydrogenation stage, a substantial increase in alcohol yields is realized, when a sulfur-sensitive catalyst, such as nickel, is employed (columns A, C, and E). However, when a sulfactive catalyst, such as molybdenum sulfide supported on activated carbon is employed as the hydrogenation catalyst, the total potential increase in alcohol is not realized (columns B and E).

It is one of the purposes of the present invention to provide a process whereby the overall yield and selectivity of alcohols from the carbonylation reaction is substantially increased.

It is also an object of the present invention to decrease the quantity of by-products from this reaction, which only are of secondary value as fuel.

It is a still further object of the present invention to modify the aldehyde synthesis process so that sulfur-insensitive catalysts may be employed in the hydrogenation step without loss of alcohol to bottoms product.

These purposes have been accomplished and the difficulties enumerated above have been overcome, by means of the present invention. The advantages of the latter, the nature thereof, and the manner in which it is carried out, will be fully understood from the following description thereof, read with reference to the accompanying drawings which is a schematic illustration of a system suitable for carrying out a preferred embodiment of the invention.

It has now been found, and demonstrated on a commercial scale, that the yield of desired alcohol can be substantially increased and the selectivity to bottoms product substantially decreased, by recycling to the hydrogenation zone a portion of the bottoms product obtained after the desired alcohols have been removed by distillation. The quantity of recycle bottoms may vary from 5–50% of the feed to the hydrogenation zone, and hydrogenation is preferably carried out in the presence of 3 to 10% water; though the process of the invention may be carried out in connection with any desired hydrogenation catalyst, its effects are realized to the greatest advantage when a sulfactive catalyst is employed. Not only, as a result of the invention, is there obtained a suppression of the reactions favoring the formation of bottoms product, but there results an actual net disappearance of bottoms.

The present invention will best be understod from the more detailed description hereinafter, wherein reference is made to the accompanying drawing.

Referring now to the drawing, an olefinic hydrocarbon having one carbon atom less than the number of carbon atoms in the desired resulting alcohol, and containing dissolved a catalyst promoting the reaction of olefinic compounds with carbon monoxide and hydrogen to form aldehydes is fed to the lower portion of primary reactor 2 through feed line 4. Reactor 2 comprises a reaction vessel which may, if desired, be packed with non-catalytic material, such as Raschig rings, porcelain chips, pumice, and the like. Reactor 2 may be divided into discrete packed zones, or it may comprise but a single packed zone or even, if desired, it may contain no packing.

Concurrently through line 3 there may be injected into reactor 2, water in amount up to about 10% of the olefin feed. Though desirable under certain circumstances, the injection of water may be omitted.

The olefin feed preferably contains dissolved therein 1–3% by weight (on the olefin) of cobalt naphthenate, stearate, or other high molecular weight cobalt soap. Other compounds of cobalt or iron, however, may also be used. A gas mixture comprising $H_2$ and CO in the approximate ratio of 0.5–2 volumes of $H_2$ per volume of CO is supplied through line 6 to primary reactor 2 and flows concurrently through reactor 2 with the liquid feed. Reactor 2 is preferably operated at a pressure of about 2000–4000 p. s. i. g. and at a temperature of about 225°–450° F. The rate of flow of synthesis gases, olefin and solvent through reactor 2 is so regulated that the desired conversion level of the olefin is obtained. Total feed throughput rates of from 0.2–1.5 v./v./hr. are employed.

Liquid oxygenated reaction products containing some catalyst in solution, in part as the metal carbonyl, and unreacted synthesis gases are withdrawn overhead from an upper portion of high pressure reactor 2 and are transferred through line 8 to cooler 10 in which any conventional means of cooling is employed, and from there via line 12 to high pressure separator 14 where unreacted gases are withdrawn overhead through line 16, scrubbed in scrubber 18 free of entrained liquid and cobalt carbonyl, and preferably recycled to reactor 2 via line 20.

A stream of primary reaction product containing dissolved therein relatively high concentrations of cobalt carbonyl is withdrawn from separator 14 through line 22. A portion of said withdrawn stream may be recycled, if desired, to reactor 2 via line 24 and recycle pump 25 to aid in the cooling and maintaining of temperature control of the primary carbonylation stage. The balance of the primary reaction product may be withdrawn through pressure release valve 26 and through line 28. The withdrawn liquid may comprise unreacted olefins in solution and secondary reaction products as well as aldehydes and dissolved cobalt carbonyl; it is passed to a catalyst removal zone 30, wherein by suitable heat treatment at about 200°–400° F. the dissolved catalyst is decomposed to the metal. A stream of hydrogen-comprising gas may be admitted to zone 30 through line 32 to aid in stripping and removing the evolved CO resulting from the decomposition of the metal carbonyl. Zone 30 may be operated at high pressures, though preferably pressures are in the range of 15–200 p. s. i. g. The gas stream comprising $H_2$ and CO may be removed from zone 30 through line 34 and used in any manner desired.

Liquid oxygenated products now substantially free of carbonylation catalyst are withdrawn from zone 30 through line 36 and passed to hydrogenator 38. Simultaneously hydrogen is supplied to reactor 38 through line 39 in proportions sufficient to convert the organic carbonyl compounds in the oxygenated feed into alcohols. Though hydrogenator 38 may contain a mass of any conventional hydrogenation catalyst, highest efficiencies, in accordance with the present invention, are realized when employing a mass of hydrogenation catalyst comprising 10% molbdenum sulfide supported on an activated carbon carrier. Hydrogenator 38 may be operated at pressures of from 2500–4500 p. s. i. g. and at temperatures of from 300° to 600° F. depending upon the nature of the aldehyde product being treated. Reactor 38 is preferably, however, operated at temperatures of about 400° to 500° F., pressures of about 2000–3500 p. s. i. g., preferably 2800–3200 p. s. i. g., a liquid feed rate of about 0.25 to 2 v./v./hr., and an $H_2$ feed rate of from about 5000–20,000 normal cu. ft. per bbl. of feed.

What is preferably injected into hydrogenator 38 through line 53 and pump 55. The amount of water added may be as much as 50%, though preferably 1 to 10% of the total feed to 38 may be supplied. Water addition may be continuous or intermittent. The rate of addition is determined to some extent by the rate of decobalter feed addition and may be about 0.0025 to 0.2 v./v./hr. If desired, the injected water may be preheated to the hydrogenation oven temperatures.

The products of the hydrogenation reaction may be withdrawn overhead through line 40, then passed through cooler 42 into high pressure separator 44, where unreacted hydrogen may be withdrawn overhead through line 46 for further use in the system, if desired. Liquid products are withdrawn from liquid-gas separator 44 through line 48 and passed, if desired, to settler 61, where water may be withdrawn through line 63, and the upper alcohol containing layer passed to hydrocarbon still 50 via line 59, where low-boiling products, mostly hydrocarbons boiling below the alcohol product desired are distilled overhead. Thus, when a $C_7$ olefin fraction is the feed to carbonylation reactor, generally the product boiling up to 340° F. is removed as a heads cut in hydrocarbon still 50. This material may be withdrawn overhead through line 52 and may be used as a gasoline blending agent.

The bottoms from this primary distillation are withdrawn from still 50 and sent through line 54 to alcohol still 56 where product alcohols boiling in the desired range may be removed overhead by distillation at atmospheric or reduced pressures, depending upon their molecular weight through line 58.

The bottoms from alcohol still 56, which may contain secondary reaction products, polymers, etc., boiling above the boiling point of the desired alcohol, are continuously withdrawn through line 60. At least a portion of these withdrawn bottoms product is passed via valved line 62 back to hydrogenation vessel 38 of the total feed to the hydrogenation zone. The quantity of recycled bottoms may vary from about 5 to 50%, depending upon reaction conditions, process variables, such as rate of bottoms formation and the nature of the olefin and alcohol. When operating in accordance with the invention, it is preferable to avoid washing the hydrogenator effluent prior to distillation with caustic. It is most desirable to produce caustic-free bottoms when operating the recycle technique, as caustic would foul the coils in the hydrogenation zone and poison the catalyst.

The balance of the bottoms product not recycled may be withdrawn through line 64 and passed to storage or be employed in any manner desired.

The system illustrated in the drawing and in the foregoing description permits of various modification without departure from the spirit of the invention. Thus, though the invention realizes its highest degree of utility when water is injected into the system, in particular into the hydrogenation zone, the invention may also be beneficially practiced without this; also, the invention may be practiced with a sulfur-sensitive catalyst in the hydrogenation zone, but here again the highest utility of the process of the invention is not realized.

The invention may be further illustrated by the following examples which point out clearly the advantages gained when operating in accordance with the present invention.

*Example I*

To demonstrate the feasibility of recycling bottoms from the alcohol distillation process to increase the total alcohol yield on a laboratory scale, a sample of bottoms was freed of octyl alcohol by vacuum distillation, and the alcohol-free high boiling material was added in a concentration of 15 vol. per cent to the feed to the hydrogenation system. The feed consisted essentially of octyl aldehydes obtained by subjecting a $C_7$ olefin fraction to the aldehyde synthesis reaction. The hydrogenation catalyst was 10% molybdenum sulfide on activated carbon, and water had been added to the carbonylation stage.

|  | Run A | Run B | Calculated Values [1] |
|---|---|---|---|
| Feed | $C_8$ Aldehyde From Oxo Stage | | |
| Vol. Percent Fractionator Bottoms | .0 | 15 |  |
| Feed Rate, V./V./Hr | 0.59 | 0.59 |  |
| Temp., °F | 502 | 502 |  |
| Water, Vol. Percent in Feed | 6.8 | 7.7 |  |
| Carbonyl No. of Product | 2.5 | 5.2 |  |
| Alcohol Yield: | | | |
|   Wt. Percent of Hydro Product | 66.4 | 59.0 | 57.3 |
|   Vol. Percent of Hydro Product | 64.3 | 57.8 | 54.7 |
| Selectivity to: | | | |
|   $C_8$ Hydrocarbon | 4.3 | 2.2 |  |
|   Aldehyde | 1.1 | 1.3 |  |
|   Alcohol | 80.0 | 69.0 |  |
|   Bottoms | 14.6 | 27.5 |  |

[1] Assuming added bottoms behaved as inert diluent.

These results indicate that the alcohol yields obtained by recycling distillation bottoms are considerably in excess of the values calculated in the assumption that the distillation bottoms behaved as in inert diluent.

*Example II*

As a result of the favorable laboratory operations, a plant test was carried out in the 250 B./D. semi-commercial operation, employing recycle of the alcohol distillation bottoms. About 1000 gallons of distillation bottoms were recycled and mixed with about 9000 gallons of hydrogenation feed, and the resulting crude alcohol was segregated to determine the effect of the recycle operations in alcohol yield and quantity. The hydrogenation unit feed consisted essentially of octyl aldehydes prepared by reaction of a $C_7$ olefin fraction which in turn was prepared by polymerizing propylene in the presence of butylene with CO and $H_2$ in the presence of a cobalt catalyst. Hydrogenation was carried out under conventional conditions over a molybdenum sulfide-activated carbon catalyst in the presence of a minor amount of water. Concurrent with the plant hydrogenation, a sample of the same 10% bottoms hydrogenation feed was also hydrogenated in a bomb over a nickel catalyst and in the presence of 10% added water.

|  | Bomb Hydrogenation | | | | Plant Hydrogenation | | | |
|---|---|---|---|---|---|---|---|---|
|  | Normal Operation | | 10% Bottoms | Calculated [1] | Normal Operation | | 10% Bottoms | Calculated [1] |
| Period | A | B | C |  | A | B | C |  |
| Conv., Mol. Percent | 74.6 | 78.6 | 77.5 |  | 76.6 | 78.8 | 78.5 |  |
| Selectivity to: | | | | | | | | |
|   $C_8$ Hydrocarbon | 0.9 |  | 0.6 | 0.6 | 1.9 | 4.3 | 3.7 | 0.6 |
|   $C_8$ Aldehyde and Alcohol | 86.4 | 88.5 | 81.2 | 92.5 | 86.5 | 83.2 | 76.8 | 89.5 |
|   Bottoms | 12.7 | 11.5 | 18.2 | 6.9 | 11.6 | 12.5 | 19.5 | 8.6 |

[1] The calculated values represent selectivity after subtracting out the 10 vol. percent bottoms on the basis it went through the hydrogenation stage unchanged.

The above data clearly indicate the favorable results that are obtained when operating in accordance with the present invention. Not only is there an increase in alcohol selectivity of about 4–6% in the bomb hydrogenation over the active nickel catalyst, and an increase in alcohol selectivity of 3–4% in the plant hydrogenation over the sulfactive molybdenum sulfide-activated carbon catalyst, but also there is a corresponding decrease in the net yield of bottoms product. At a production level of twelve to twenty million pounds of alcohols per year, this increase in alcohol yield and decrease in by-product represents a significant factor in the economic attractiveness of the process.

While the foregoing description and exemplary operations have served to illustrate specific applications and results, the invention is not limited thereto. Other modifications may appear to those skilled in the art without deviating from the spirit of the invention.

What is claimed is:

1. In a carbonylation process wherein olefins, carbon monoxide and hydrogen are contacted in an initial carbonylation zone with a cobalt carbonylation catalyst under conditions to produce oxygenated reaction products comprising aldehydes, and wherein said reaction products are further subjected to a hydrogenation reaction in the presence of a hydrogenation catalyst in a hydrogenation zone to produce alcohols having one more carbon atom than said olefins, and the products from said hydrogenation zone are distilled from higher boiling secondary reaction products forming a bottoms product and said alcohols recovered, the improvement which comprises recycling at least a portion of said bottoms product to said hydrogenation zone, blending said recycled bottoms with effluent from said carbonylation zone and subjecting said blended material to a hydrogenation reaction in said zone whereby the overall yield of alcohol product containing one more carbon atom than said olefins is increased and the over-all yield of bottoms product reduced.

2. The process of claim 1 wherein said catalyst comprises molybdenum sulfide supported on activated carbon.

3. The process of claim 1 wherein a minor proportion of water is injected into said hydrogenation zone.

4. The process of claim 3 wherein a minor proportion of water is injected into said carbonylation zone.

5. An improved process for the production of alcohols from olefins, carbon monoxide and hydrogen which comprises contacting olefins, CO and $H_2$ with a cobalt carbonylation catalyst at pressures of about 2000–4000 p. s. i. g. and temperatures of about 225°–450° F. produce a reaction product comprising substantially aldehydes having one more carbon atom than said olefins, passing said product to a hydrogenation zone, subjecting said product to hydrogenation conditions of temperature and pressure in the presence of a sulfactive hydrogenation catalyst, adding a minor amount of water to said hydrogenation zone, withdrawing organic products comprising alcohols having one more carbon atom than said olefins and secondary reaction products boiling higher than said alcohols from said hydrogenation zone, subjecting said withdrawn material to a distillation process in an alcohol distillation zone, withdrawing overhead a product comprising substantially said alcohols, withdrawing distillation bottoms from said reaction zone, and recycling at least a portion of said last-named material to said hydrogenation zone.

6. The process of claim 5 wherein 5 to 50% of the total feed to said hydrogenation zone comprises said recycled bottoms product.

7. The process of claim 5 wherein 1 to 10% water is added to said hydrogenation zone.

8. The process of claim 7 wherein 3 to 10% water based on olefin feed is added to said carbonylation zone.

References Cited in the file of this patent

UNITED STATES PATENTS

| Number | Name | Date |
|---|---|---|
| 2,415,102 | Landgraf et al. | Feb. 4, 1947 |
| 2,500,913 | Schexnailder | Mar. 14, 1950 |
| 2,504,682 | Harlan | Apr. 18, 1950 |
| 2,530,989 | Parker | Nov. 21, 1950 |
| 2,564,130 | Schreyer | Aug. 14, 1951 |
| 2,594,341 | Owen et al. | Apr. 29, 1952 |
| 2,595,096 | Parker | Apr. 29, 1952 |

OTHER REFERENCES

Ruhrchemie German Patent Application R654, T. O. M. Reel 36, Item 21 and part of Item 36 (Translation available in Meyer Translation PS–C–V, "Oxo Process," pp. 10–11). Deposited in Library of Congress, March 12, 1946.

U. S. Naval Technical Mission in Europe, "The Synthesis of Hydrocarbons and Chemicals from CO and $H_2$," Technical Report No. 248–45, pages 123 and 124. (This report was published as PB–22841 (Abstract). Listed in bibliography of Scientific and Industrial Reports, Department of Commerce, OTS, vol. 2, No. 5, page 321, August 2, 1946.)